(12) United States Patent
Aoki et al.

(10) Patent No.: US 6,584,485 B1
(45) Date of Patent: Jun. 24, 2003

(54) 4 TO 2 ADDER

(75) Inventors: Naoaki Aoki, Austin, TX (US); Sang Hoo Dhong, Austin, TX (US); Nobuo Kojima, Austin, TX (US); Ohsang Kwon, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/549,766

(22) Filed: Apr. 14, 2000

(51) Int. Cl.[7] .................................................. G06F 7/50
(52) U.S. Cl. ........................ 708/708; 708/709; 708/710
(58) Field of Search .............................. 708/700–714, 708/670, 518, 201

(56) References Cited

U.S. PATENT DOCUMENTS

| | | | | |
|---|---|---|---|---|
| 4,839,850 A | * | 6/1989 | Noll et al. .................. | 708/709 |
| 5,299,319 A | * | 3/1994 | Vassiliadis et al. ......... | 712/221 |
| 5,818,747 A | * | 10/1998 | Wong ........................ | 708/702 |
| 6,345,286 B1 | * | 2/2002 | Dhong et al. ............... | 708/708 |
| 6,411,980 B2 | * | 6/2002 | Yoshida ..................... | 708/709 |
| 6,449,629 B1 | * | 9/2002 | Morgan ..................... | 708/518 |

OTHER PUBLICATIONS

Hatsch et al., Carry Ripple Adder, Oct. 10 2002, United States patent application Publication No. U.S. 2002/0147756 A1.*

* cited by examiner

*Primary Examiner*—Chuong Dinh Ngo
*Assistant Examiner*—Chat C. Do
(74) *Attorney, Agent, or Firm*—Casimer K. Salys; Bracewell & Patterson, L.L.P.

(57) ABSTRACT

A four-input to two-output adder is disclosed. The four-input/two-output adder includes a sum-lookahead full adder and a modified full adder. The sum-lookahead full adder includes an XOR3 block and an AXOR block for receiving a first input, a second input, a third input, and an input from a forward adjacent adder to generate a first sum signal and a sum-lookahead carry signal, respectively. The modified full adder includes an XOR2 block and a MUX2 block for receiving the first sum signal from the sum-lookahead-full adder, a fourth input, and a sum-lookahead carry signal from a backward adjacent adder to generate a second sum signal and a carry signal, respectively.

10 Claims, 4 Drawing Sheets

4 TO 2 ADDER

BACKGROUND OF THE INVENTION

1. Technical Field

The present invention relates to an apparatus for data processing in general, and in particular to a binary adder. Still more particularly, the present invention relates to a four-input/two-output binary adder.

2. Description of the Prior Art

The two most commonly encountered binary adders in digital arithmetic circuit arrangements are carry-propagate adders (CPAs) and carry-save adders (CSAs). CPAs are typically designed to have two data inputs and one output. CPAs operate according to well-known principles in which addend bits of the same order are added together, and a carry bit will be transferred to an adjacent higher order bit when required. A sum is directly derived from a bit-by-bit addition, with an appropriate carry to an adjacent higher order bit and a single bit carry out from the highest order bit position. The ripple carry of a CPA tends to result in slow non-parallel operations because high order bits computations are dependent on the results from low order bits.

CSAs, on the other hand, typically have three data inputs and two outputs. Carry bits in CSAs are accumulated separately from the sum bits of any given order (or position). The output of CSAs are two vectors, namely, a sum and a carry, which when added together yield the final result. One benefit of CSAs is that high-order bits have no dependency on any low-order bit because all bit positions are calculated independently, thereby avoiding the propagation latency associated with carry bits in CPAs. Because of their speed and simplicity, CSAs are pervasively found in digital logic designs.

The present disclosure provides a four input/two output CSA adder.

SUMMARY OF THE INVENTION

In accordance with a preferred embodiment of the present invention, a four-input/two-output adder includes a sum-lookahead full adder and a modified full adder. The sum-lookahead full adder includes an XOR3 block and an AXOR block for receiving a first input, a second input, a third input, and an input from a forward adjacent, adder to generate a first sum signal and a sum-lookahead carry signal, respectively. The modified full adder includes an XOR2 block and a MUX2 block for receiving the first sum signal from the sum-lookahead full adder, a fourth input, and a sum-lookahead carry signal from a backward adjacent adder to generate a second sum signal and a carry signal, respectively.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
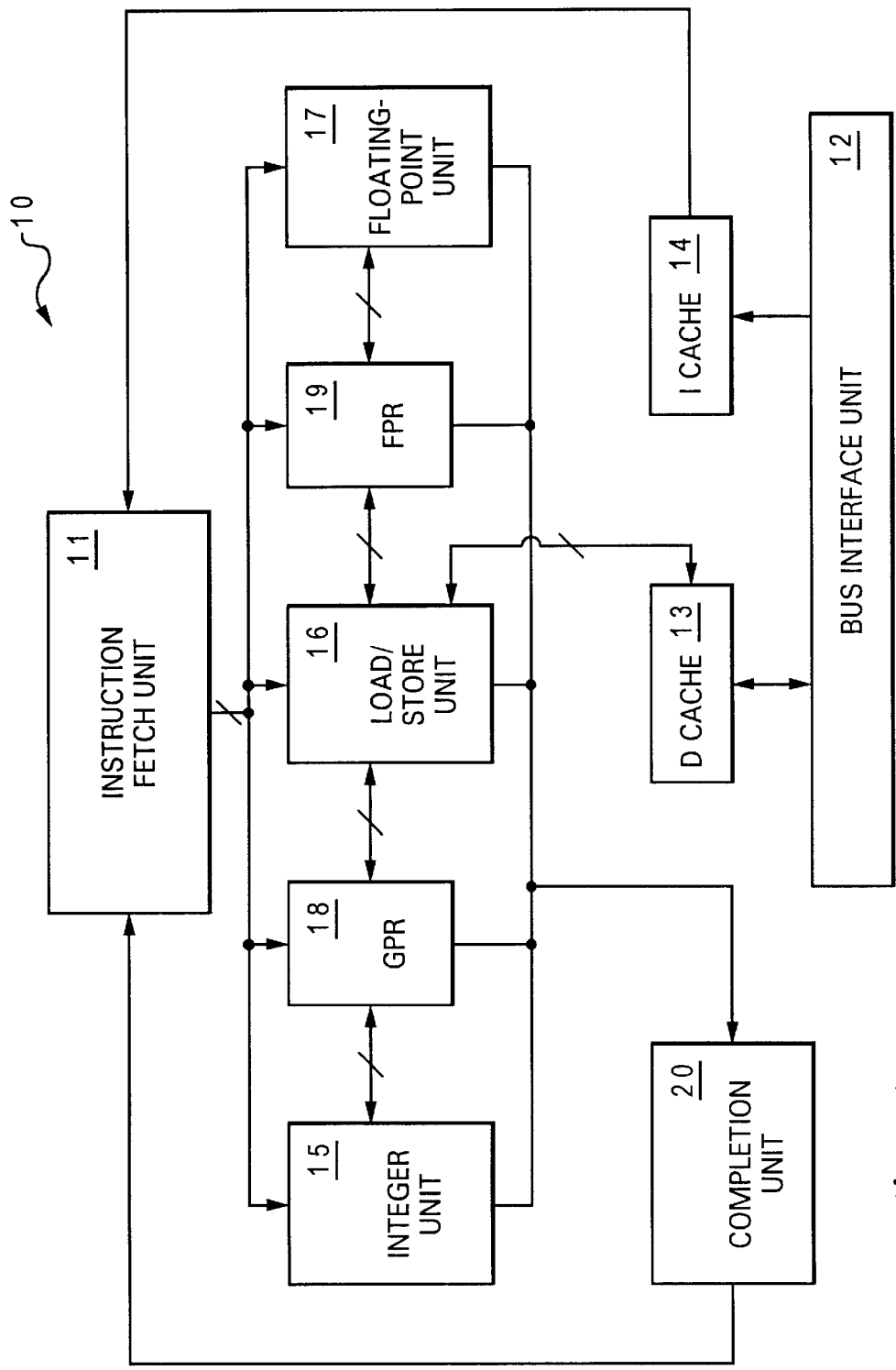
FIG. 1 is a block diagram of a processor in which a preferred embodiment of the present invention may be incorporated.

Referring now to the drawings and in particular to FIG. 1, there is depicted a block diagram of a processor in which a preferred embodiment of the present invention may be incorporated. Within a processor 10, a bus interface unit 12 is coupled to a data cache 13 and an instruction cache 14. Both data cache 13 and instruction cache 14 are high speed set-associative caches which enable processor 10 to achieve a relatively fast access time to a subset of data or instructions previously transferred from a main memory (not shown). Instruction cache 14 is further coupled to an instruction fetch unit 11 which fetches instructions from instruction cache 14 during each execution cycle.

Processor 10 also includes three execution units, namely, an integer unit 15, a load/store unit 16, and a floating-point unit 17. Four-input/two-output adders can be found within integer unit 15 and floating-point unit 17. Each of execution units 15–17 can execute one or more classes of instructions, and all execution units 15–17 can operate concurrently during each processor cycle. After execution has terminated, execution units 15–17 store data results to a respective rename buffer, depending upon the instruction type. Then, any one of execution units 15–17 signals a completion unit 20 that the instruction unit has been finished. Finally, instructions are completed in program order by transferring result data from the respective rename buffer to a general purpose register 18 or a floating-point register 19.

Figure 2:
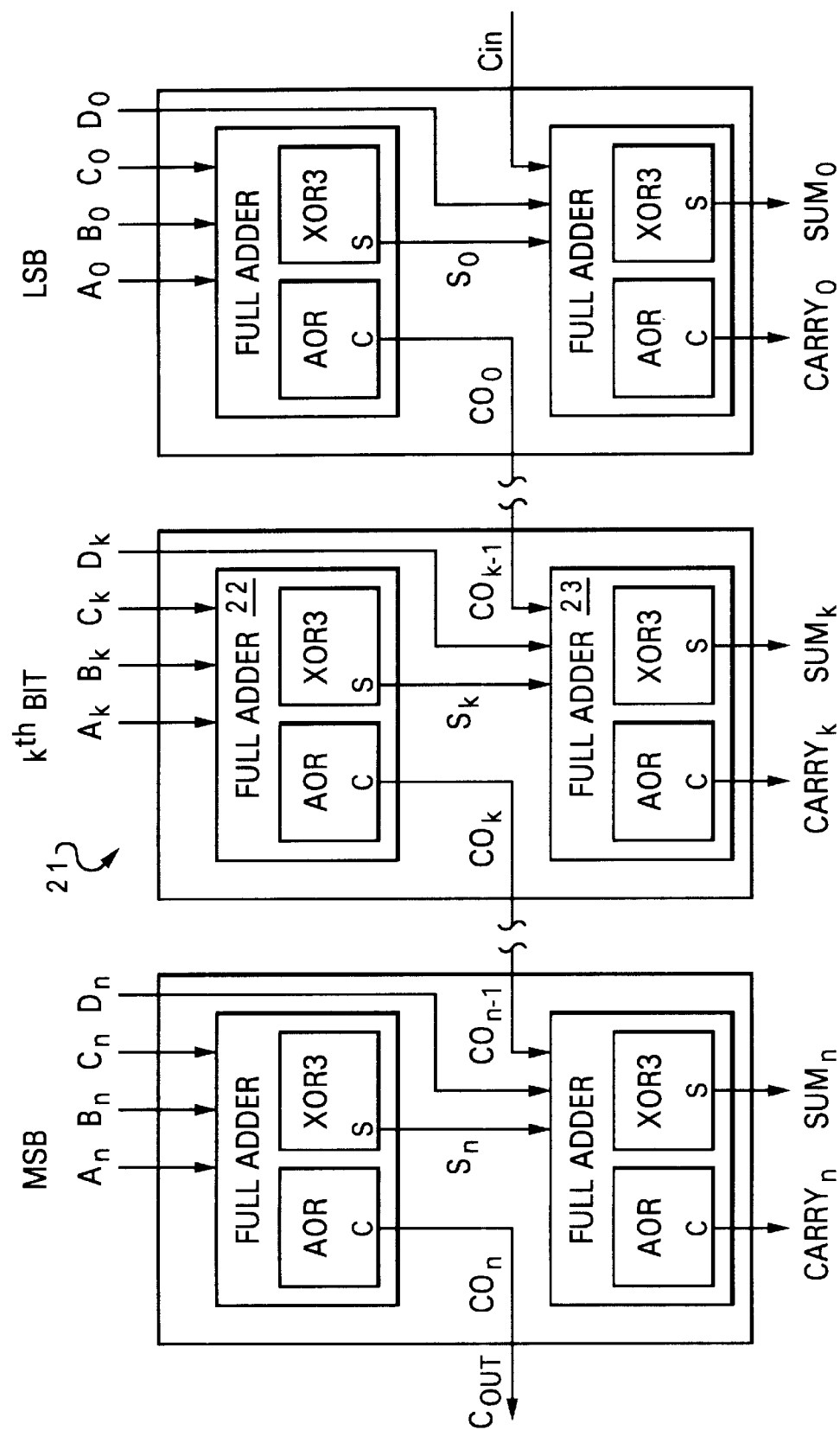
FIG. 2 is a block diagram of a conventional four-input/two-output adder.

With reference now to FIG. 2, there is illustrated a block diagram of a conventional four-input/two-output adder. As shown, a four-input/two-output adder 21 includes full adders 22 and 23, which are identical to each other. Each of full adders 22 and 23 includes an AOR block and an XOR3 block. The AOR block performs logical AND and logical OR operations on three inputs to generate a carry (C) signal. The XOR3 block performs logical XOR operations on three inputs to generate a sum (S) signal. By combining full adders 22 and 23 as shown in FIG. 2, four-input/two-output adder 21 produces a $CARRY_k$ signal and a $SUM_k$ signal from inputs $A_k$, $B_k$, $C_k$, and $D_k$, as follows:

| | |
|---|---|
| XOR3 block in full adder 22: | $S_k = A_k \text{ XOR } B_k \text{ XOR } C_k$ |
| AOR block in full adder 22: | $CO_k = A_k \cdot B_k + B_k \cdot C_k + C_k \cdot A_k$ |
| XOR3 block in full adder 23: | $SUM_k = S_k \text{ XOR } CO_{k-1} \text{ XOR } D_k$ |
| AOR block in full adder 23: | $CARRY_k = S_k \cdot CO_{k-1} + CO_{k-1} \cdot D_k + D_k \cdot S_k$ | where $CO_{k-1}$ comes from a full adder of a previous stage adjacent (backward adjacent) to four-input/two-output adder 21. Similar to $CO_k$ from full adder 22, $CO_{k-1}$ is formed by an AOR block in a full adder from a previous stage using inputs $A_{k-1}$, $B_{k-1}$, and $C_{k-1}$. The total delay of four-input/ two-output adder 21 is equivalent to the total delay of full adders 22 and 23.

Figure 3:
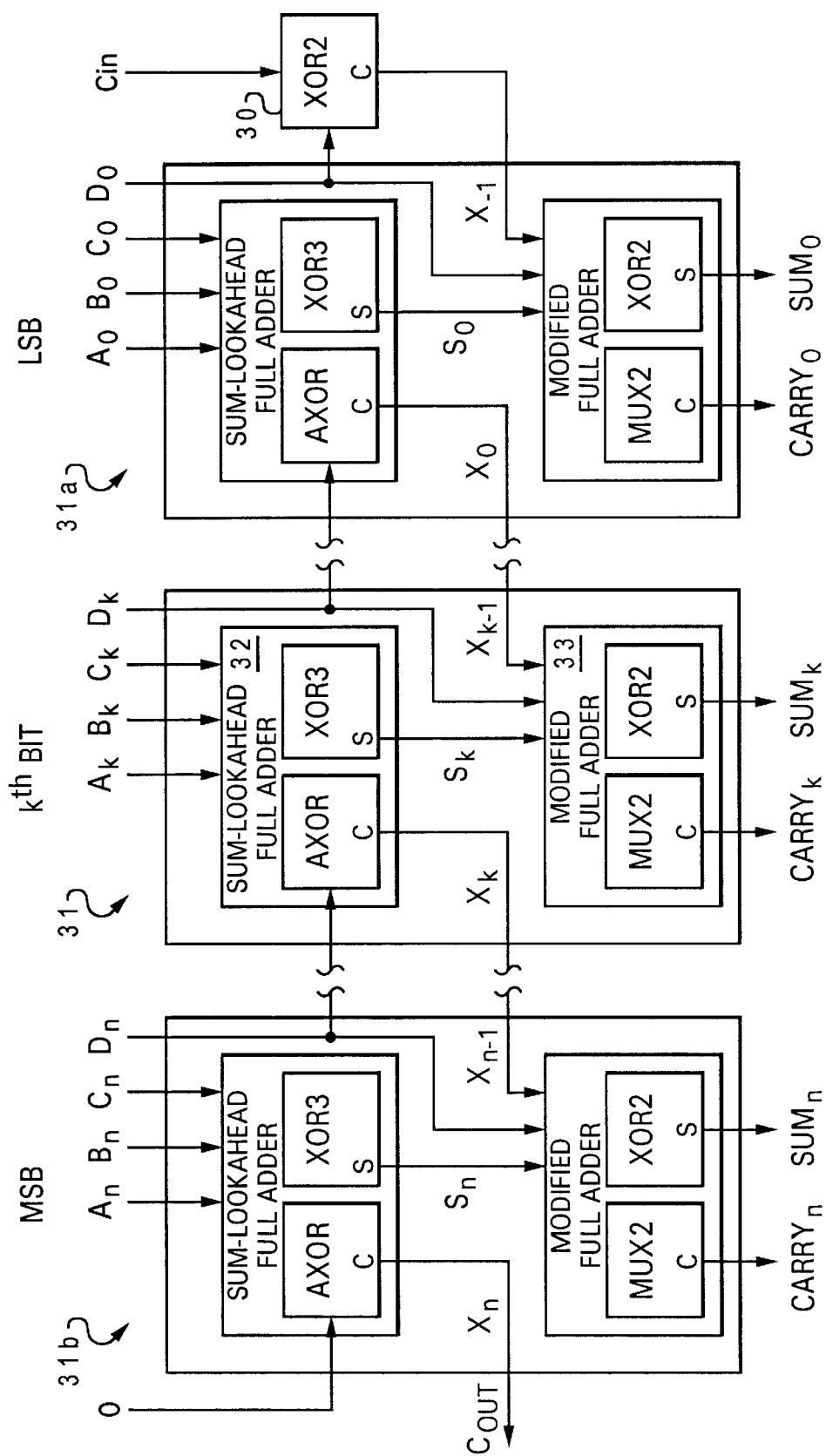
FIG. 3 is a block diagram of a four-input/two-output adder in accordance with a preferred embodiment of the present invention.

The present invention provides a four-input/two-output adder that is faster than conventional four-input/two-output adder 21. Referring now to FIG. 3, there is illustrated a block diagram of a four-input/two-output adder in accordance with a preferred embodiment of the present invention. As shown, a four-input/two-output adder 31 includes a sum-lookahead full adder 32 and a modified full adder 33. Sum-lookahead full adder 32 includes an AXOR block and an XOR3 block. The AXOR block performs logical AND, logical OR, and XOR operations on four inputs to generate a sum-lookahead carry signal. The XOR3 block performs logical XOR operations on three inputs to generate a sum signal. Modified full adder 33 includes a MUX2 block and an XOR2 block. The MUX2 block performs logical AND and logical OR operations on three inputs and a complement of one of the three inputs to generate a CARRY signal. The XOR2 block performs logical XOR functions on two inputs to generate a SUM signal.

Specifically, the AXOR block of sum-lookahead full adder 32 receives signals $A_k$, $B_k$, $C_k$, and $D_{k+1}$ to generate a sum-lookahead carry signal $X_k$. The signal $D_{k+1}$ comes from a four-input/two-output adder of a next stage adjacent (forward adjacent) to four-input/two-output adder 31. The XOR3 block of sum-lookahead full adder 32 receives signals $A_k$, $B_k$, and $C_k$ to generate a sum signal $S_k$. The MUX2 block of modified full adder 33 receive the sum signal $S_k$ from sum-lookahead full adder 32, a $D_k$ signal, and a sum-lookahead carry signal $X_{k+1}$ from an AXOR block within a sum-lookahead full adder of a previous stage adjacent to four-input/two-output adder 31 to generate a $CARRY_k$ signal. The XOR2 block of modified full adder 33 receive the sum signal $S_k$ from sum-lookahead full adder 32 and the sum-lookahead carry signal $X_{k+1}$ to generate a $SUM_k$ signal.

By combining a sum-lookahead full adder, such as sum-lookahead full adder 32, and a modified full adder, such as modified full adder 33, as shown in FIG. 3, a four-input/two-output adder 31 produces a $CARRY_k$ signal and a $SUM_k$ signal from inputs $A_k$, $B_k$, $C_k$, and $D_k$, as follows:

XOR3 block in full adder 32: $S_k = A_k$ XOR $B_k$ XOR $C_k$

AXOR block in full adder 32: $X_k = (A_k \cdot B_k + B_k \cdot C_k + C_k \cdot A_k)$ XOR $D_{k+1}$ XOR2 block in modified full adder 33: $SUM_k = S_k$ XOR $X_{k-1}$ MUX2 block in modified full adder 33: $CARRY_k = (S_k \cdot X_{k-1}) + (D_k \cdot \overline{X}_{k-1})$ where $X_{k-1}$ comes from an AXOR block within a sum-lookahead full adder of a stage backward adjacent to four-input/two-output adder 31, and $D_{k+1}$ comes an input from a four-input/two-output adder of a stage forward adjacent to four-input/two-output adder 31.

For a four-input/two-output adder 31a at the least significant bit (LSB) position, $X_{-1}$ is formed by a XOR2 block 30 using inputs $C_{in}$, and $D_0$. The total delay of four-input/two-output adder 31 is equivalent to the total delay of sum-lookahead full adder 32 and modified full adder 33.

An n-bit four-input/two-output adder is depicted in FIG. 3. Each of the four-input/two-output adders, such as four-input/two-output adder 31, is identical to each other and operates on a single bit position. For example, four-input/two-output adder 31a operates on the least significant bits $A_0$ $B_0$ $C_0$ $D_0$ and four-input/two-output adder 31b operates on the most significant bits $A_n$ $B_n$ $C_n$ $D_n$. The SUM and CARRY signals for each four-input/two-output adder are generated similar to the equations for four-input/two-output adder 31 depicted above.

There are several differences between four-input/two-output adder 31 and four-input/two-output adder 21 shown in FIG. 2. First, a two-way exclusive-OR is utilized in the AXOR block of four-input/two-output adder 31 to receive an input signal from a forward adjacent four-input/two-output full adder to generate a sum-lookahead carry signal. Second, a two-way exclusive-OR is utilized in the XOR2 block of four-input/two-output adder 31 (instead of a 3-way exclusive OR in the XOR3 block of four-input/two-output adder 21) to generate a SUM signal. Third, a 2:1 multiplexor is utilized in the MUX2 block of four-input/two-output adder 31 (instead of an AND-OR gate in the AOR block of four-input/two-output adder 21) to generate a CARRY signal. Because sum-lookahead full adder 32 and modified full adder 33 are faster than full adders 22 and 23 (from FIG. 2), four-input/two-output adder 31 is faster than four-input/two-output adder 21.

Figure 4:
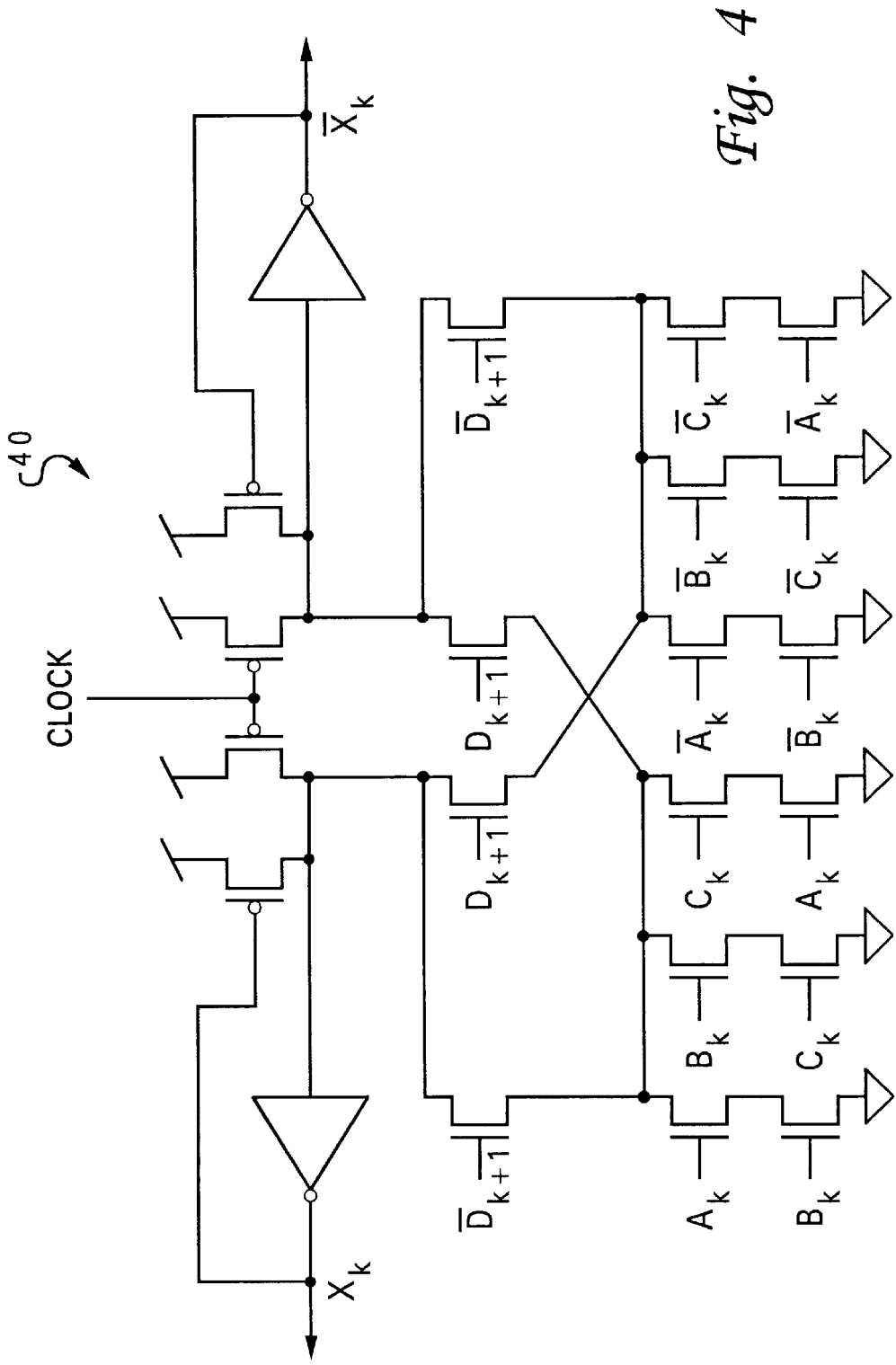
FIG. 4 is a schematic diagram of an AXOR block within the four-input/two-output adder from FIG. 3, in accordance with a preferred embodiment of the present invention.

With reference now to FIG. 4, there is illustrated a schematic diagram of the AXOR block within sum-lookahead full adder 32 of four-input/two-output adder 31 from FIG. 3, in accordance with a preferred embodiment of the present invention. As shown, an AXOR block 40 has three levels of n-channel transistors stacked on top of each other. Even though AXOR block 40 has one more level of n-channel transistors than the AOR block in full adder 22 from FIG. 2, but because there are also three levels of n-channel transistors in the XOR3 block (in full adder 22 from FIG. 2 and sum-lookahead full adder 32 from FIG. 3), the additional level of n-channel transistors within AXOR block 40 does not contribute any penalty to the total performance of sum-lookahead full adder 32.

On the other hand, modified full adder 33 of four-input/two-output adder 31 includes a two-way exclusive-OR configuration (i.e., the XOR2 block) and a 2:1 multiplexor (i.e., the MUX2 block) to generate a SUM signal and a CARRY signal, respectively. Each of the two-way exclusive-OR configuration and the 2:1 multiplexor has only two levels of n-channel transistors, which is one level less than the XOR3 block in full adder 23 from FIG. 2. As a result, four-input/two-output adder 31 is faster than four-input/two-output adder 21.

As has been described, the present invention provides an improved four-input/two-output adder.

While the invention has been particularly shown and described with reference to a preferred embodiment, it will be understood by those skilled in the art that various changes in form and detail may be made therein without departing from the spirit and scope of the invention.

What is claimed is:

1. A four-input/two-output adder comprising:
   a sum-lookahead full adder for receiving a first input, a second input, a third input, and an input from a forward adjacent adder to generate a first sum signal and a first carry signal; and
   a modified full adder having two-levels of transistors, coupled to said sum-lookahead full adder, for receiving said first sum signal, a fourth input, and a carry signal from a backward adjacent adder to generate a second sum signal and a second carry signal.

2. The four-input/two-output adder according to claim 1, wherein said first sum signal is generated by $S_k = A_k$ XOR $B_k$ XOR $C_k$, wherein $S_k$ is said first sum signal, $A_k$ is said first input, $B_k$ is said second input, and $C_k$ is said third input.

3. The four-input/two-output adder according to claim 2, wherein said first carry signal is generated by $X_k = (A_k \cdot B_k + B_k \cdot C_k + C_k \cdot A_k)$ XOR $D_{k+1}$, wherein $X_k$ is said first carry signal and $D_{k+1}$ is said input from a forward adjacent adder.

4. The four-input/two-output adder according to claim 3, wherein said second sum signal is generated by $SUM_k = S_k$ XOR $X_{k-1}$, wherein $SUM_k$ is said second sum signal, $X_{k-1}$ is said carry out signal from a backward adjacent adder.

5. The four-input/two-output adder according to claim 4, wherein said second carry signal is generated by $CARRY_k =$ $(S_k \cdot X_{k-1}) + (D_k \cdot \overline{X}_{k-1})$, wherein $CARRY_k$ is said second carry signal and $D_k$ is said fourth input.

6. A processor comprising:

an instruction unit; and an execution unit coupled to said instruction unit, wherein said execution unit includes a four-input/two-output adder having a sum-lookahead full adder for receiving a first input, a second input, a third input, and an input from a forward adjacent adder to generate a first sum signal and a first carry signal; and a modified full adder having two-levels of transistors, coupled to said sum-lookahead full adder, for receiving said first sum signal, a fourth input, and a carry signal from a backward adjacent adder to generate a second sum signal and a second carry signal.

7. The processor according to claim 6, wherein said first sum signal is generated by $S_k = A_k$ XOR $B_k$ XOR $C_k$, wherein $S_k$ is said first sum signal, $A_k$ is said first input, $B_k$ is said second input, and $C_k$ is said third input.

8. The processor according to claim 7, wherein said first carry signal is generated by $X_k = (A_k \cdot B_k + B_k \cdot C_k + C_k \cdot A_k)$ XOR $D_{k+1}$, wherein $X_k$ is said first carry signal and $D_{k+1}$ is said input from a forward adjacent adder.

9. The processor according to claim 8, wherein said second sum signal is generated by $SUM_k = S_k$ XOR $X_{k-1}$, wherein $SUM_k$ is said second sum signal, $X_{k-1}$ is said carry out signal from a backward adjacent adder.

10. The processor according to claim 9, wherein said second carry signal is generated by $CARRY_k = (S_k \cdot X_{k-1}) + (D_k \cdot \overline{X}_{k-1})$, wherein $CARRY_k$ is said second carry signal and $D_k$ is said fourth input.

\* \* \* \* \*